(12) United States Patent
Viégas et al.

(10) Patent No.: US 11,093,703 B2
(45) Date of Patent: Aug. 17, 2021

(54) GENERATING CHARTS FROM DATA IN A DATA TABLE

(71) Applicant: Google Inc., Mountain View, CA (US)

(72) Inventors: Fernanda Viégas, Mountain View, CA (US); Martin Wattenberg, Winchester, MA (US); Daniel Smilkov, Boston, MA (US); James Wexler, Newton, MA (US); Daniel Gundrum, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/719,425

(22) Filed: Sep. 28, 2017

(65) Prior Publication Data
US 2018/0088753 A1 Mar. 29, 2018

Related U.S. Application Data

(60) Provisional application No. 62/401,647, filed on Sep. 29, 2016.

(51) Int. Cl.
*G06F 40/00* (2020.01)
*G06F 40/18* (2020.01)
(Continued)

(52) U.S. Cl.
CPC ............ *G06F 40/18* (2020.01); *G06F 3/0482* (2013.01); *G06F 16/2282* (2019.01);
(Continued)

(58) Field of Classification Search
CPC .................................................... G06T 11/206
(Continued)

(56) References Cited

U.S. PATENT DOCUMENTS 5,461,708 A * 10/1995 Kahn .................... G06F 17/246
345/440
5,701,400 A * 12/1997 Amado .................... G06N 5/02
706/45

(Continued)

FOREIGN PATENT DOCUMENTS

| JP | 2011-502303 A | 1/2011 |
|---|---|---|
| JP | 2014-532235 A | 12/2014 |
| WO | 2009/055263 A2 | 4/2009 |

OTHER PUBLICATIONS

Anonymous. Jun. 6, 2016. "Predicting Chart Types with Machine Learning—Feature Releases—Chartio Community". Web Archive. http://web.archive.org/web/20160606043352/http://community.chartio.com:80/t/predicting-chart-types-with-machine-learning/93. Retrieved on Nov. 23, 2017. pp. 1-3. 3 pages.

(Continued)

*Primary Examiner* — Cesar B Paula
*Assistant Examiner* — David Faber
(74) *Attorney, Agent, or Firm* — Lowenstein Sandler LLP

(57) ABSTRACT

A method for generating a chart suggestion list using data present in a data table includes parsing cells of the data table to identify one or more columns and one or more data types of the cells, performing a statistical analysis of the one or more columns to obtain one or more statistics about the one or more columns, and creating one or more suggested charts based on the one or more statistics about the one or more columns and the one or more data types of the cells. Each of the one or more suggested charts represents at least a subset of the data in the data table. The method also includes generating a chart suggestion list including at least one of the one or more suggested charts.

19 Claims, 10 Drawing Sheets

(51) Int. Cl.
*G06F 16/248* (2019.01)
*G06F 16/22* (2019.01)
*G06F 40/177* (2020.01)
*G06F 40/216* (2020.01)
*G06F 3/0482* (2013.01)
*G06T 11/20* (2006.01)

(52) U.S. Cl.
CPC .......... *G06F 16/248* (2019.01); *G06F 40/177* (2020.01); *G06F 40/216* (2020.01); *G06T 11/206* (2013.01)

(58) Field of Classification Search
USPC ........................................................ 715/215
See application file for complete search history.

(56) References Cited

U.S. PATENT DOCUMENTS

| | | | | |
|---|---|---|---|---|
| 6,006,239 | A * | 12/1999 | Bhansali | G06F 40/18 |
| 7,522,176 | B2 * | 4/2009 | Tolle | G06T 11/206 |
| | | | | 345/619 |
| 8,307,119 | B2 * | 11/2012 | Rochelle | G06Q 10/10 |
| | | | | 709/248 |
| 8,447,886 | B2 * | 5/2013 | Rochelle | G06F 40/174 |
| | | | | 709/248 |
| 8,464,161 | B2 | 6/2013 | Giles et al. | |
| 9,135,233 | B2 * | 9/2015 | Fan | G06F 16/221 |
| 9,202,297 | B1 * | 12/2015 | Winters | G06T 11/206 |
| 9,852,120 | B2 * | 12/2017 | Rochelle | H04L 67/42 |
| 10,380,778 | B2 * | 8/2019 | Apte | G06T 1/00 |
| 10,515,145 | B2 * | 12/2019 | Canton | G06F 40/18 |
| 10,552,998 | B2 * | 2/2020 | Stokes | G06F 40/18 |
| 2003/0105816 | A1 * | 6/2003 | Goswami | G06Q 10/10 |
| | | | | 709/204 |
| 2004/0267871 | A1 * | 12/2004 | Pratley | G06Q 10/10 |
| | | | | 709/200 |
| 2006/0061547 | A1 * | 3/2006 | Bramwell | G06Q 10/06 |
| | | | | 345/156 |
| 2007/0208992 | A1 * | 9/2007 | Koren | G06Q 10/10 |
| | | | | 715/212 |
| 2007/0299880 | A1 | 12/2007 | Kawabe et al. | |
| 2008/0005677 | A1 * | 1/2008 | Thompson | G06Q 10/00 |
| | | | | 715/744 |
| 2008/0082908 | A1 * | 4/2008 | MacGregor | G06Q 10/10 |
| | | | | 715/215 |
| 2008/0222562 | A1 * | 9/2008 | Helfman | G06F 17/246 |
| | | | | 715/810 |
| 2009/0287673 | A1 | 11/2009 | Chronister et al. | |
| 2012/0330939 | A1 * | 12/2012 | McCloskey | G06Q 30/02 |
| | | | | 707/723 |
| 2013/0009963 | A1 * | 1/2013 | Albrecht | G06T 11/206 |
| | | | | 345/473 |
| 2013/0080444 | A1 * | 3/2013 | Wakefield | G06F 17/30994 |
| | | | | 707/748 |
| 2013/0097177 | A1 | 4/2013 | Fan et al. | |
| 2013/0097544 | A1 * | 4/2013 | Parker | G09B 29/003 |
| | | | | 715/771 |
| 2013/0145244 | A1 * | 6/2013 | Rothschiller | G06F 40/18 |
| | | | | 715/212 |
| 2013/0254644 | A1 * | 9/2013 | Rochelle | G06F 17/246 |
| | | | | 715/212 |
| 2014/0071138 | A1 * | 3/2014 | Gibson | G06T 11/206 |
| | | | | 345/501 |
| 2014/0164071 | A1 * | 6/2014 | English | G06F 16/283 |
| | | | | 705/7.37 |
| 2014/0372854 | A1 * | 12/2014 | Otero | G06F 40/18 |
| | | | | 715/219 |
| 2016/0055140 | A1 | 2/2016 | McKenzie et al. | |
| 2016/0314549 | A1 * | 10/2016 | Carothers | G06Q 50/18 |
| 2016/0357720 | A1 * | 12/2016 | Thimbleby | G09G 5/026 |
| 2017/0177559 | A1 * | 6/2017 | Dang | G06Q 30/0201 |
| 2017/0220543 | A1 * | 8/2017 | Canton | G06F 40/111 |
| 2017/0277437 | A1 * | 9/2017 | Jones | G06F 16/178 |
| 2018/0075551 | A1 * | 3/2018 | Dayama | G06Q 50/12 |
| 2018/0165851 | A1 * | 6/2018 | Apte | G06T 1/00 |
| 2018/0365263 | A1 | 12/2018 | Mohan et al. | |
| 2019/0179501 | A1 | 6/2019 | Seeley et al. | |

OTHER PUBLICATIONS

Jeffrey Heer et al. Feb. 20, 2012. "Interactive Dynamics for Visual Analysis—ACM Queue". Queue. http://queue.acm.org/detail.cfm?id=2146416. Retrieved on Oct. 2, 2014. pp. 1-33. 33 pages.

PCT Search Report & Written Opinion, Re: Application #PCT/US2017/054457 dated Dec. 4, 2017.5 pages.

PCT International Search Report and Written Opinion for International Application No. PCT/US2017/054457, dated Dec. 4, 2017, 17 pages.

European Patent Application No. 17783690.5 Office Action dated Jul. 16, 2020, 9 pages.

Japanese Patent Application No. 22019-513007 Office Action dated Jun. 9, 2020, 8 pages.

Korean Patent Application No. 10-2019-7009757 Office Action dated Aug. 28, 6 pages.

Korean Patent Application No. 10-2019-7009757 Office Action dated Feb. 22, 2021, 6 pages.

Japanese Patent Application No. 22019-513007 Office Action dated Dec. 8, 2020, 2 pages. and English translation, 2 pages. 4 pages total.

Satellite Office Co., Ltd., Google Apps Installation and Setting Guide for Small Company, Shoeisha Co., Ltd., Jan. 15, 2013, 1st edition, pp. 26-27. (Originally cited as Reference 3 in Office Action dated Dec. 8, 2020 for Japanese Patent Application No. 22019-513007).

Nikkei BP Planning, Innovative XML Database Engine "Shunsaku", Nikkei BP Planning, Mar. 22, 2004, 1st Edition, pp. 104-108. (Originally cited as Reference 4 in Office Action dated Dec. 8, 2020 for Japanese Patent Application No. 22019-513007).

* cited by examiner

| Name | Answer | Value A | Value B |
|---|---|---|---|
| James | Yes | 4 | 1 |
| Martin | Yes | 5 | 1 |
| Fernanda | No | 2 | 3 |
| Daniel | No | 2 | 0 |
| Jimno | No | 2 | 2 |

600 / 602 / 604 / 606 / 120

| Answer | Sum of Value A | Sum of Value B |
|---|---|---|
| Yes | 9 | 2 |
| No | 6 | 5 |

610 / 612 / 614 / 608

| Answer | Count |
|---|---|
| Yes | 2 |
| No | 3 |

GENERATING CHARTS FROM DATA IN A DATA TABLE

RELATED APPLICATIONS

This patent application claims the benefit under 35 U.S.C. § 119(e) of U.S. Provisional Application No. 62/401,647, filed Sep. 29, 2016, which is herein incorporated by reference.

TECHNICAL FIELD

Aspects and implementations of the present disclosure relate to electronic documents, and more specifically, to generating charts from data in a data table.

BACKGROUND

Data tables in databases, spreadsheet documents, word processing documents, slideshow documents, and so forth may include numerous cells containing data. Users may desire to visualize the data in a more meaningful way than in the data table. For example, some spreadsheet applications allow users to create components (e.g., charts or graphs) of data in a spreadsheet based on selections made by the user of data from a data table in the spreadsheet. Such chart creation methods include receiving instructions from the user for selections of a subset of data from the spreadsheet and a selected component, such as a chart, for representing the selected subset of data. To create the chart, a user has to analyze the data in the spreadsheet to identify relationships in the data and decide the best way to represent the identified relationships.

SUMMARY

Aspects and implementations of the present disclosure improve data representation technology by generating a chart suggestion list including one or more generated charts based on a data table. The cells of a data table may be parsed to identify the columns and data types of cells in the data table. A statistical analysis may be performed on the data table to obtain one or more statistics about the columns in the data table. Suggested charts may be created based at least on the statistics and the data types of the cells. In some implementations, one or more rules or a machine learning model may be applied to the data table to identify a relationship between groups of data, to score various chart types, additional data tables, and/or generated charts based on numerous factors, and/or to produce suggested chart types.

The suggested charts may illuminate relationships and/or patterns in the data table of which the user may initially be unaware. The suggested charts may be created using a subset of the data in the data table, which may enhance processing speed of generating the charts and/or reduce network traffic by transmitting a chart generated using just a subset of the data table as opposed to the entire data table. The suggested charts may be included in a chart suggestion list that is displayed in a first portion of a user interface while the data table is concurrently displayed in a second portion of the user interface. As such, an improved graphic user interface may be provided that conveniently displays suggested charts in the chart suggestion list concurrently with the data table, and allows the user to select and insert a suggested chart directly from the chart suggestion list into an electronic document containing the data table.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 6 illustrates an example of aggregate tables generated from data present in a data table, according to an illustrative implementation.

DETAILED DESCRIPTION

Figure 1:
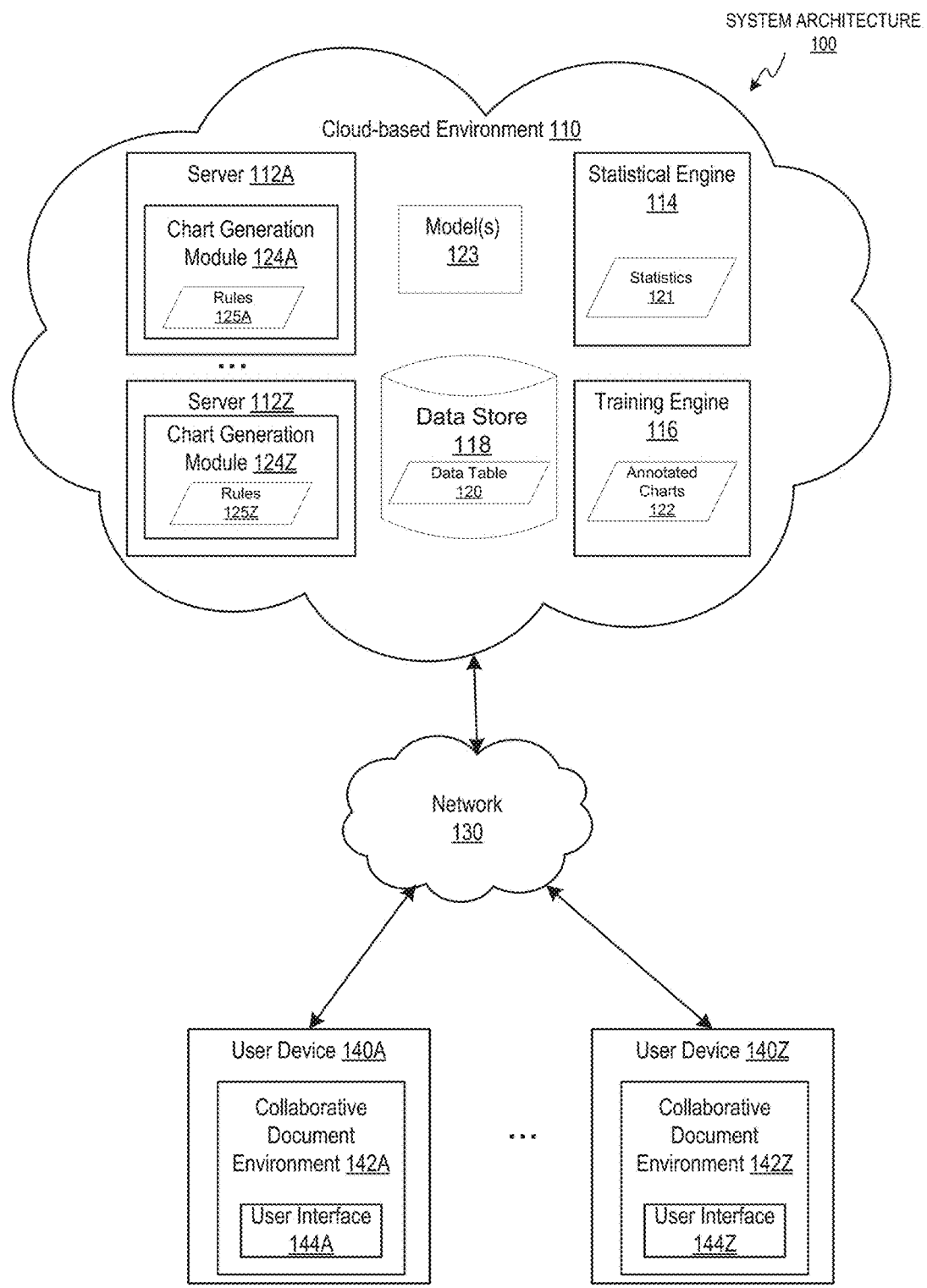
FIG. 1 illustrates an example of a system architecture for implementations of the present disclosure.

Conventionally, generating a chart may include a user analyzing data in a data table to determine how various data in the data table are related to each other or to determine various patterns in the data. Then, the user may select which component(s) (e.g., chart, graph, etc.) may suitably represent the desired data. However, the analysis and selection of components may take substantial effort on the part of the user and may cause the user to miss important subtle relationships or patterns in the data. Further, the user may select a larger portion of data than is called for to adequately represent a desired relationship or pattern with a component. In such a case, the processing speed of a computing device may be slowed down by generation of a component with a large dataset and/or network bandwidth may be adversely affected when a component based on a large dataset is delivered over a network to a user device.

Aspects and implementations of the present disclosure are directed to a collaborative document system that addresses at least these deficiencies, among others, by generating a chart suggestion list including one or more charts generated from data in a data table. Although a chart suggestion list is referred to herein, it should be understood that any suitable graphical component (e.g., graph) for visualizing data may be generated and provided in a component suggestion list. The implementations disclosed herein may be applied to any suitable data structure that includes a tabular format (e.g., rows and columns) to generate charts in a chart suggestion list. For example, one such data structure may include a data table included in a data store, a word processing document, a slideshow document, a spreadsheet document, etc. Further, although a collaborative document system is described as implementing the disclosed techniques throughout the remainder of the disclosure, it should be noted that any suitable system or application (e.g., standalone application installed on a user device) that can access a data table may generate one or more charts based on the data table for a chart suggestion list.

Collaborative document systems may allow an electronic document owner to invite other users to join as collaborators with respect to an electronic document stored in a cloud-based environment. An electronic document refers to media content used in electronic form. Media content may include text, data tables, videos, images, graphs, slides, charts, software programming code, designs, lists, plans, blueprints, maps, etc. An electronic document to which users have been granted permission to access and/or edit concurrently may be referred to as a collaborative document herein. The collaborative document may be provided to user devices of the collaborators by one or more servers in a cloud-based environment. Each collaborator may be associated with a user type (e.g., editor, reviewer, viewer, etc.). Different views and capabilities may be provided to the collaborators based on their user type to enable editing, commenting on, reviewing, or simply viewing the collaborative document. Once granted permission to access the collaborative document, the collaborators may access the collaborative document to perform operations allowed for their user type.

Using the collaborative document system, a user may create or open a collaborative document and share the collaborative document with one or more collaborators. The collaborative document may include a data table with rows and columns having column headers. The data table may also include numerous cells storing data having one or more data types (e.g., numbers, strings, floating point numbers, dates, etc.). In an implementation, the cells of the data table may be parsed to identify one or more columns and one or more data types of the cells. Statistical analysis may be performed on the data table to obtain one or more statistics about the columns in the data table. For example, the statistics may include a number of unique values in each of the columns or a data range in the columns. In some implementations, additional data tables may be created based on the statistics. The additional tables may contain a subset of data and/or transformed (e.g., aggregated, summed, averaged, etc.) data from the initial data table. One or more suggested charts may be created using the initial data table and/or the additional data tables.

In some implementations, rules may be applied to a data table (e.g., the initial data table, additional data tables, etc.) to identify a relationship (e.g., a correlation between two column headers, a correlation between values of two columns, etc.) between groups of data (e.g., at least two columns of data) in the data table. The rules may define how to score possible chart types for the data table or generated charts to indicate how well a specific chart type or generated chart can present the data from the data table. The rules may provide a correlation between a particular score or a score range and such factors as the statistics, the data types of the cells, the identified relationship, criteria related to available components (e.g., charts, graphs, etc.), etc. Further, the rules may require that chart types or generated charts that score above a minimum threshold be presented to a user, and other chart types and generated charts be discarded. In another implementation, the statistics and the data types of the cells may be applied as inputs to a machine learning model that is trained to produce one or more chart types for the data table. The chart types provided by the rules and/or the machine learning model may be used to create suggested charts including at least a subset of data from the data table. The suggested charts may be included in a chart suggestion list. The chart suggestion list may be displayed in a first portion of a user interface provided by the collaborative system and the data table may be concurrently displayed in a second portion of the user interface.

The created charts may represent certain subsets of data in an interesting way that the user may not have contemplated on their own. For example, by parsing the cells and determining the data types of the cells, statistics about the columns, and/or identifying relationships between groups of data, patterns in sets of data may be identified automatically without any user involvement. Further, the disclosed techniques may enhance processing speed by selecting smaller subsets of data to use in creating the charts, selecting charts that more efficiently handle the specific data, and the like. For example, in some implementations, data in a data table may be transformed by aggregation, summation, or averaging, which may reduce the number of rows to represent in the chart. Further, charts that satisfy certain criteria may be selected in some implementations, which may enhance processing speed of generating the charts. Also, an enhanced graphical user interface may be provided that concurrently displays a data table and a chart suggestion list. A user may directly select a chart from the chart suggestion list to be included in the collaborative document without switching between different screens, windows or user interfaces.

FIG. 1 is an example of a system architecture 100 for implementations of the present disclosure. The system architecture 100 includes a cloud-based environment 110 connected to user devices 140A-140Z via a network 130. Although the system architecture 100 is described in the context of a cloud-based environment 110, which may enable communication between servers 112A-112Z in the cloud-based environment 110 and with user devices 140A-140Z over the network 130 to store and share data, it should be understood that the implementations described herein may also apply to systems that are locally interconnected. The cloud-based environment 110 refers to a collection of physical machines that host applications providing one or more services (e.g., chart generation for inclusion in a chart suggestion list) to multiple user devices 140A-140Z via the network 130. The network 130 may be public networks (e.g., the Internet), private networks (e.g., a local area network (LAN) or wide area network (WAN)), or a combination thereof. Network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, network 130 may include a wired infrastructure (e.g., Ethernet).

The cloud-based environment 110 may include one or more servers 112A-112Z, a statistical engine 114, a training engine 116, and/or a data store 118. The statistical engine 114, the training engine 116, and/or the data store 118 may be separate from the servers 112A-112Z and communicatively coupled to the servers 112A-112Z or the statistical engine 114, the training engine 116, and/or the data store 118 may be part of one or more of the servers 112A-112Z. The data store 118 may store a data table 120 that may include data in cells arranged by rows and columns with column headers. The data store 118 may also include a collaborative document of which the data table 120 is a part. The collaborative document may be a spreadsheet document, a slideshow document, a word processing document, or any suitable electronic document (e.g., an electronic document including text, data tables, videos, images, graphs, slides, charts, software programming code, designs, lists, plans, blueprints, maps, etc.) that can be shared with users.

The collaborative document including the data table 120 may be created by an author and the author may share the collaborative document with other users (e.g., collaborators). Sharing the collaborative document may refer to granting permission to the other users to access (view and/or edit) the collaborative document. Sharing the collaborative document may include informing the other users of the collaborative document 116 via a message (e.g., email, text message, etc.) including a link to the collaborative document. The level of permissions that each user is granted may be based on the user type of each particular user. For example, a user with an editor user type may be able to open the collaborative document and make changes directly to the collaborative document. As such, numerous collaborators may make changes to the data table 120 presented in the collaborative document.

The statistical engine 114 and/or the training engine 116 may include a processing device or devices, such as a computer, microprocessor, logic device or other device or processor that is configured with hardware, firmware, and software to carry out some of the embodiments described herein. The statistical engine 114 may be used to parse the cells of the data table 120 and identify one or more columns, column headers, and/or data types of the cells. The statistical engine 114 may determine one or more statistics 121 about the columns in the data table 120. For example, the statistics 121 may include an aggregation of the unique values in each column. An aggregation may refer to a calculation over the data to reveal information about the data. The statistics 121 may also include a range of values in each of the columns, a distribution of the data (e.g., whether the data values are randomly distributed or distributed in a trending (increasing/decreasing) manner), a number of rows in the data table 120, and so forth.

The training engine 116 may include annotated charts 122 that are used as training data by the training engine 116. A machine learning model 123 may refer to a model artifact that is created by the training engine 116 using training inputs and corresponding target outputs. The training inputs may include the annotated charts 122, and the corresponding target outputs may include suggested chart types for respective training inputs, additional generated tables, or suggested charts generated based on the training inputs. The annotated charts 122 may include the training data tables that are used and resulting charts that are created based on the training data tables. Further, the annotated charts 122 may be annotated manually by a developer or user. In some implementations, these annotated charts 122 may include annotations to label various columns and data sets in training data tables. In some implementations, the target outputs of the trained machine learning model 123 may also include scores for suggested chart types, additional generated tables, and/or generated suggested charts to indicate how well they reflect interesting relationships and/or statistics, among other things.

The annotations may include certain relationships between the annotated columns of the training data tables. To illustrate, in a training data table including sales data, the annotation may indicate a relationship that is designated for visualization (e.g., between a column header "quantity sold," and a column header "region sold"). In another example, the annotation may indicate a dependency relationship where there is a correlation between values of two or more columns (e.g., a date column increases with values of a sales column). In some implementations, relationships between different columns may be dynamically determined based on column headers and group headers. For example, if a training data table contains individual headers such as "quantity sold," "region sold," etc. there may also be a group header for each year (e.g., 2016, 2017, etc.). The individual headers may be repeated/shared across the groups so the relationship between the sales information for various years may be determined. In some implementations, annotations may be for statistics (e.g., aggregations, summations, averages, etc.) associated with columns and may indicate a preferred chart type (e.g., bar, line, pie, area, scatter, column, etc.) to use for representing the training data table with the column having the particular statistics. In some implementations, annotations may be for correlations between values having certain data types in the columns. For example, the annotation may indicate a preferred chart type for a combination of columns in which data values having a date data type of a first column increase and data values having a number data type of a second column also increase (e.g., as sales accumulate over time), or another preferred chart type for a combination of columns in which the data values of one column increase (e.g., dates) and the data values of another column decrease (e.g., inventory amounts). In some implementations, the annotation may indicate whether a chart may be faceted. Once trained, the machine learning model 116 may be applied to a new data table 120 (including, for example, the statistics 121 and the data types of the cells) to obtain one or more suggested chart types for the new data tables. In some implementations, the machine learning model 116 may output the suggested charts for inclusion in a chart suggestion list.

The servers 112A-112Z may be physical machines (e.g., server machines, desktop computers, etc.) that each include one or more processing devices communicatively coupled to memory devices and input/output (I/O) devices. Each of the servers 112A-112Z may host a chart generation module (124A-124Z). The chart generation modules 124A-124Z may be implemented as computer instructions that are executable by one or more processing devices on each of the servers 112A-112Z. In some implementations, the statistical engine 114 may be implemented as computer instructions and included as part of the chart generation module 124A-124Z. The chart generation modules 124A-124Z may create various suggested charts for the data in the data table 120 based in part on the statistics 121 about the one or more columns and the one or more data types of the cells. Each of the created suggested charts may represent at least a subset of the data in the data table 120.

In some implementations, the chart generation module 124A-124Z may use one or more rules 125A-125Z to create the suggested charts. The rules 125A-125Z may be predefined by a developer, and the rules may be applied to the data table 120 to identify relationships between groups of data in the data table 120. In some implementations, the relationship may refer to the data in the data table 120 fitting a certain model (e.g., linear, logarithmic, etc.). For example, the relationship may include a correlation between data having certain data types and values in columns of the data table 120. In some implementations, the relationship may refer to a correlation between at least two column headers (e.g., "quantity sold" and "region sold") in the data table 120, or the like. The rules 125A-125Z may also specify whether certain charts may be faceted.

In some implementations, the rules 125A-125Z may define how to combine the columns of the data table 120 in various permutations to create a set of suggested charts based on the identified relationship between at least two columns, the statistics 121 about the columns, the data types of the cells, and/or any other suitable factor. The rules 125A-125Z may be used to score the created suggested charts as discussed above. The rules 125A-125Z may require that the suggested charts that score above a minimum threshold be provided to a user while the charts that score below the minimum threshold be discarded.

In some implementations, the rules 125A-125Z may define how to score possible chart types that can be used for the data table 120 based on the identified relationship between at least two columns, the statistics 121 about the columns, the data types of the cells, and/or any other suitable factor and produce one or more chart types that score above a minimum threshold while discarding chart types that score below the minimum threshold. For example, if a first column of the data table 120 has a date data type and the dates appear in order, that factor may result in increasing a score for a line chart. If a second column in the data table 120 has a number data type and the numbers are distributed in a non-random way (e.g., they are increasing or decreasing), that factor may also result in increasing the score for a line chart. Those two factors combined may result in a high score for the line chart. In another example, if the data range of the columns indicates there is a negative number, that factor may result in decreasing a score for a pie chart. In another example, if there are a large number of unique values in the columns, that factor may result in decreasing the score for a pie chart because there would be too many slices in the pie and the pie chart may be difficult to read. In another example, if there are a large number of rows in the data table 120, that factor may result in decreasing the score for a bar chart because the bars may be too thin and close together to read coherently. In yet another example, if two columns both have number data types, and, in general, when the values in one column is higher, the values in the other column are also higher, then there may be a correlation between the values in the columns and a score for a scatter plot may be high. In some implementations, the rules 125A-125Z may define how to score possible additional tables that are generated based on an initial data table. For example, aggregate data tables may be generated using various columns in an initial data table and the rules 125A-125Z may define that a highest score be assigned to an aggregate data table that is generated using a column having the fewest unique values.

The chart generation module 124A-124Z may use the machine learning model 123 and/or the rules 125A-125Z to determine chart types and create suggested charts in accordance with the chart types. The chart generation module 124A-124Z may also generate a chart suggestion list including the suggested charts. In some embodiments, the suggested charts may be ordered according to score and/or a diversity criterion. The diversity criterion may be used to ensure that similar types of charts portraying a similar data relationship are not arranged next to one another in the chart suggestion list to ensure presentation of diverse data.

In some implementations, additional data tables may be generated from the data table 120. The additional tables may be generated from an initial data table based on the statistics 121. For example, an aggregate table may be generated that includes a sum of the unique values in a column in the data table 120. There may be other aggregation formulas used to generate an aggregate table. For example, the aggregation formula may compute an average aggregate for the information in the data table 120. Further, a transformation, such as summation, aggregation, or average, may be applied to the data values in other columns to produce transformed data associated with the selected column. Thus, the additional tables may include a subset of data from the initial data table, as well as a reduced set of transformed data. The aggregate table may be used to generate facets of data. Both aggregate tables and facets are discussed in more details in FIGS. 6 and 7. Generating charts using the additional tables may result in providing interesting charts to the user and enhancing processing efficiency by generating the charts using the smaller data sets.

One or more of the servers 112A-112Z may provide a collaborative document environment 142A-142Z to the user devices 140A-140Z. The server 112A-112Z selected to provide the collaborative document environment 142A-142Z may be based on certain load-balancing techniques, service level agreements, performance indicators, or the like. The collaborative document environment 142A-142Z may provide a user interface 144A-144Z that displays the data table 120 in a first portion and concurrently displays the chart suggestion list in a second portion. The collaborative document environment 142A-142Z may enable users using different user devices 140A-140Z to concurrently access the collaborative document including the data table 120 and/or the chart suggestion list to review, edit, view, and/or propose changes to the data table 120 and/or the chart suggestion list in a respective user interface 144A-144Z. In an implementation, the user interfaces 144A-144Z may be web pages rendered by a web browser and displayed on the user device 140A-140Z in a web browser window. In another implementation, the user interfaces 144A-144Z may be included in a stand-alone application downloaded to the user device 140A-140Z.

The user devices 140A-140Z may include one or more processing devices communicatively coupled to memory devices and I/O devices. The user devices 140A-140Z may be desktop computers, laptop computers, tablet computers, mobile phones (e.g., smartphones), or any suitable computing device. The user device 140A-140Z may include components, such as an input device and an output device. A user may authenticate with the server 112A-112Z by inputting a username and password (or providing other identification information) via the user interface 144A-144Z, such that the same user device 140A-140Z may be used by different users at different times. In some implementations, the statistical engine 114, the training engine 116, the data store 118, and/or the chart generation module 124A-124Z may be a part of user device 140A-140Z.

Figure 2:
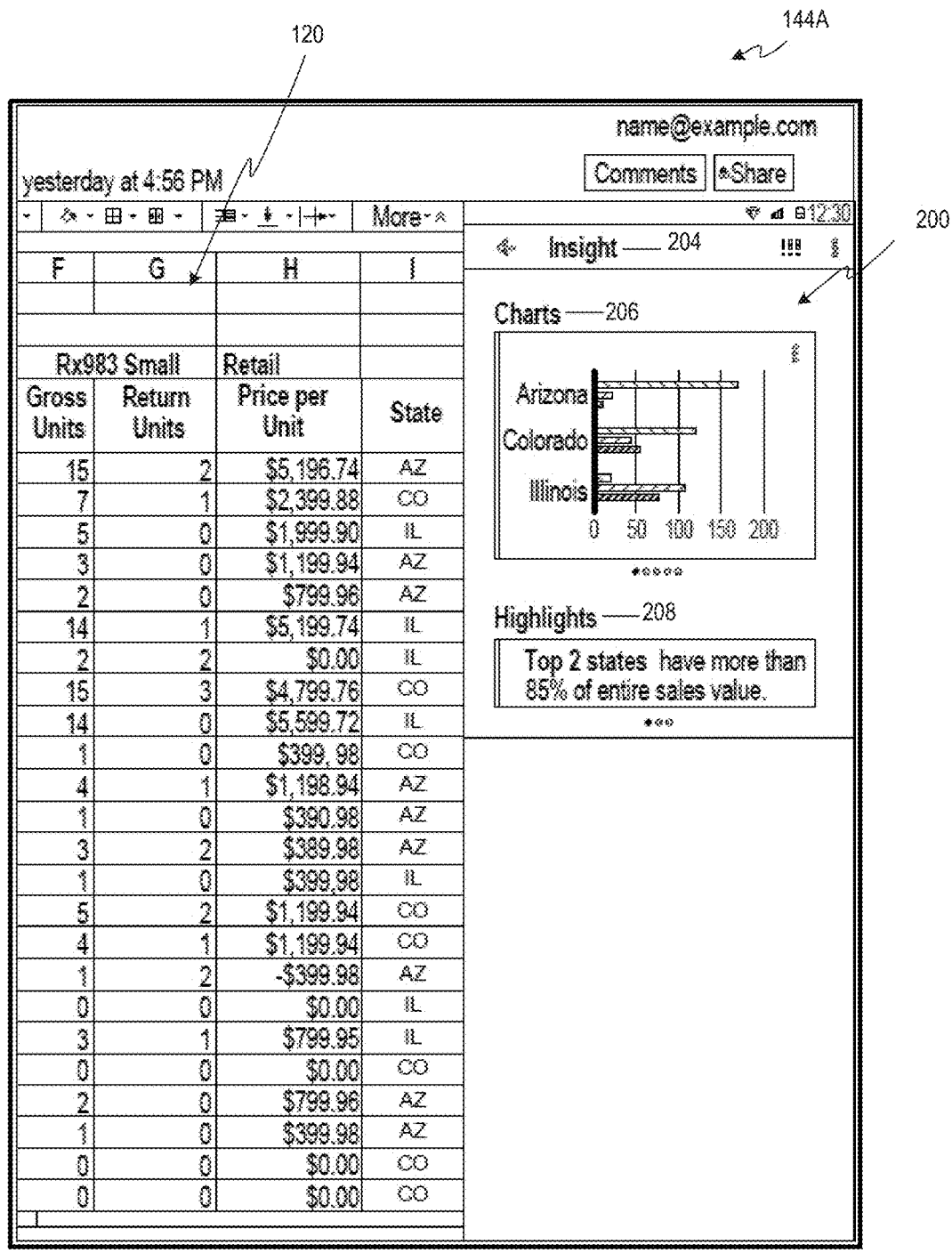
FIG. 2 illustrates an example of a chart suggestion list generated based on data in a data table, according to an illustrative implementation.

FIG. 2 illustrates an example of a chart suggestion list 200 generated based on data in a data table 120, according to an illustrative implementation. The chart suggestion list 200 is presented in a first portion of a user interface 144A of a collaborative document environment 142A that also concurrently displays the data table 120 in a second portion of the user interface 144A. In the depicted example, the data table 120 is included in a collaborative spreadsheet document.

The content in the collaborative spreadsheet document may include any one or more of data tables, chart, graphs, visual components, text, images, videos, audio clips, programming source code, or any other suitable types of content. In some implementations, the collaborative spreadsheet document may have at least two columns of data inserted into the data table 120 by the user.

The data in the data table 120 of the collaborative spreadsheet document can be parsed to determine statistics between various columns in the spreadsheet and data types of the cells of the data table 120. In some implementations, the data table 120, the statistics, and the data types may be input into a machine learning model 123 that is trained to produce suggested chart types. In some implementations, rules may be applied to the data table based on at least the statistics and the data types of the cells to produce suggested chart types that receive a score above a minimum threshold. The rules may also be used to identify relationships between at least two columns in the data table 120, and the suggested chart types may be selected based on the identified relationships, the statistics, the data types, prerequisite criteria related to the various charts, and the like. The chart generation module 124A may create suggested charts for the data table 120 using the suggested chart types and may generate the chart suggestion list 200 including the suggested charts.

As described in more detail with reference to FIG. 3, in some implementations, the user may provide a selection of a subset of the data in the data table 120. The chart generation module 124A may prioritize creating suggested charts for data in the selected portion first.

In the depicted example in FIG. 2, the user or a collaborator may insert data in the data table 120 in columns F, G, H, and I as shown. Upon the insertion of the data, an insight table 204 may be generated after one or more suggested charts are created for the data table 120 based on the statistics 121 about the columns, one or more identified relationships between at least two columns, data types of the cells, prerequisite criteria related to the charts, and so forth. For example, the insight table 204 contains a chart 206 that is a depiction of a relationship determined using the rules 125A or the machine learning model 123. As depicted, the sales data of a product "Rx983 Small" is part of the data table 120.

The statistical engine 114 may perform statistical analysis on the data table 120 and identify the number of unique values per the columns Gross Units (F), Return Units (G), Price per Unit (H), and State (I). In particular, the State column includes the least number of unique values (e.g., 3) as compared to the other columns in the data table 120. Additionally, the chart generation module 124A may apply the rules 125A or the machine learning model 123 to identify a relationship between at least two columns in the data table 120. In the depicted example, a relationship between region of sale, which may be the "State" column, and sales information, which may be a combination of the "Gross Units," "Return Units," and/or "Price per Unit" columns, may be identified. The rules 125A or the machine learning mode 123 may be used to produce a chart type of a bar chart based on the statistics and/or the identified relationship. As such, the chart generation module 124A may create a suggested bar chart 206 based on the statistics and/or the identified relationship by aggregating the sales information for the product by the "State" column. The suggested bar chart 206 may be displayed in the insights table 204 concurrently with the data table 120 in the user interface 144A.

In some implementations, if the user partially selects (e.g., by single clicking an input apparatus or by hovering over with a cursor) the suggested bar chart 206, a visual indicator may be displayed for the cells in the data table 120 that are involved in the creation of the selected chart. For example, the cells may be highlighted. Such a visual indicator may provide an enhanced user interface that enables the user to more fully comprehend what data is visualized in the suggested bar chart 206. Further, the user may add the suggested bar chart 206 directly into the collaborative spreadsheet document by fully selecting (e.g., by double clicking or holding an input apparatus).

There may also be a highlights section 208 generated in the insights table 204 that summarizes the information extracted from the data table 120 and depicted in the suggested bar chart 206. For, example, the highlights section 208 shows that the sales are concentrated in the top two states out of the three states where the product is reportedly sold.

Figure 3:
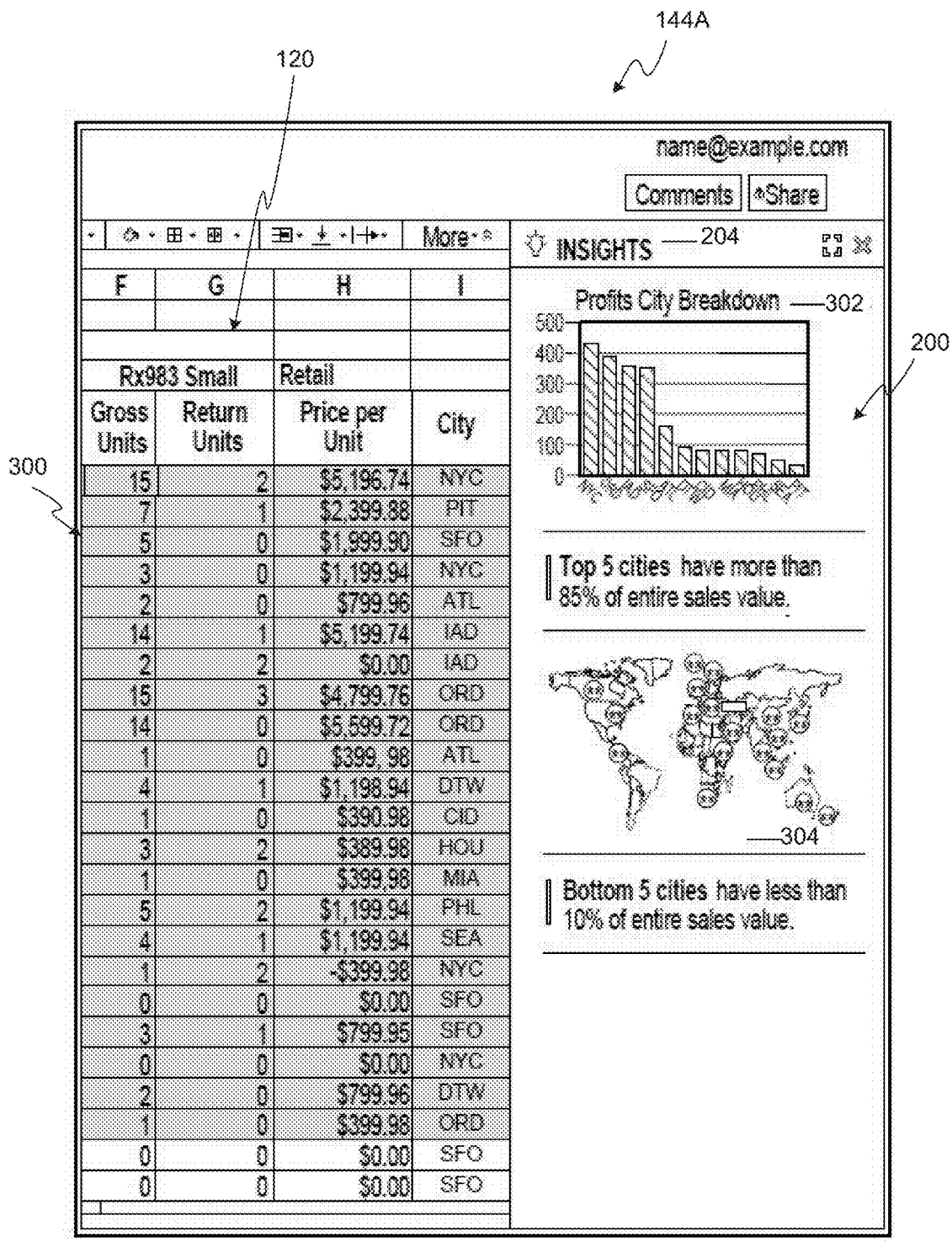
FIG. 3 illustrates an example of a chart suggestion list generated based on a user selection of data in a data table, according to an illustrative document.

FIG. 3 illustrates an example of a chart suggestion list 200 generated based on a user selection of data in a data table 120, according to an illustrative document. The data table 120 may be displayed in a user interface 144A of a collaborative spreadsheet document. In particular, the user may select a subset of the data from the data table 120, as represented by the highlighted portion of cells in the data table 120. The chart generation module 124A may generate one or more suggested charts based on the selected subset of data. For example, the data types of the columns present in the selected subset of data may be determined, statistics 121 about the columns present in the selected subset of data may be determined, a relationship may be identified for at least two columns of data present in the selected subset of data, and so forth. The rules 125A or the machine learning model 123 may be used to produce one or more suggested chart types for the selected subset of data. The chart generation module 124A may generate suggested charts based on the suggested chart types. An insights table 204 that previously displayed suggested charts representing the entire data table 120 may be dynamically updated to show at least one suggested chart representing the subset of data selected by the user.

For example, as depicted, the sales information of the product "Rx983 Small" is depicted in the data table 120. The distribution of sales information also accounts for the city of each sale. The user has selected a subset of the data in the data table 120 represented by highlighting 300. The data types for the cells of the selected subset may be determined, statistics about the columns in the selected subset of data may be determined, relationships of at least two columns in the selected subset may be identified, prerequisite criteria for various charts may be determined in view of the selected subset of data, and so forth. For example, a relationship between the city and the profits generated by the sale of the produce may be identified. The rule 125A or the machine learning model 123 may be used to produce one or more suggested chart types based on this information for the selected subset of data. The chart generation module 124A may create one or more suggested charts based on the one or more suggested chart types for the selected subset of data. For example, as depicted, suggested bar chart 302 is generated to represent the selected subset of data. A bar chart may be produced using the rule 125A or the machine learning model 123 because the number of unique values in the "City" column does not exceed a bar chart threshold, and the relationship between the "City" column and the "Sales" is identified as a relationship designated for visualization. In other words, the bar chart may be produced because it may be determined to represent the selected subset of data more clearly to the user than other types of charts.

Further, geographical chart 304 may also be generated by the chart generation module 124A and included in the chart suggestion list 200. The geographical chart 304 may be chosen since the selected subset of data includes a column with a column header of "City." The rule 124A or the machine learning model 123 may be used to determine that a geographical chart may be useful in representing data that includes a geographical indicator, such as a city. However, the geographical chart 304 may not have received as high of a score as the bar chart 302 because it does not display the profits by city as clearly as the bar chart. Accordingly, the geographical chart 304 may be displayed lower in the chart suggestion list 200. The chart generation module 124A may update the chart suggestion list 200 displayed in the insights table 204 to include both the suggested bar chart 302 and the geographical chart 304.

In some implementations, the processing of the data table 120 comprises removing data that may not add any value to the relationship identifying process or to the statistics determining process. For example, an ID field in a database is a list of unique identifiers for each record in the data table 120 and no inference may be derived from the ID field. Thus, the ID field may be superfluous to determining meaningful statistics about the columns and/or determining a relationship between at least two columns in the data table 120. In some implementations, the processing of the data table 120 may include analyzing the column headers and data types for each column in the data table 120 to determine the type of data in the columns which is used to establish the relationship or relationships between various columns in the data table 120.

A user may interact with the insights table 204 depicted in FIGS. 2 and 3. In some implementations the interaction may be the selection of a suggested chart in the chart suggestion list 200 to be displayed in the collaborative spreadsheet document with the data table 120. When selected, the suggested chart may be inserted into the collaborative spreadsheet document. In some implementations, once the chart is selected, the user may then proceed to modify the names of the different fields, the data range or the type of chart selected to match a personal preference. In some implementations, the user may close the insights table 204 and not use any of the insights or charts provided by the insight table 204 and create a new chart for a relationship not explored by the rule 125A or the machine learning model 123. Any interaction with the suggested bar chart 206 may be recorded and provided to the training engine 116 for updating of the machine learning model 123. For example, if the user selects the suggested bar chart 206, modifies any axes names, fonts, colors, or the like, then this information may be provided to the training engine 116 so the machine learning model 123 may be updated to produce chart types for similar data that are personally tailored and more likely to be selected by the user. It should be understood that the user interfaces 144A depicted in FIGS. 2 and 3 are for illustrative purposes. The data tables 120 and/or the suggested charts in the user interfaces 144A may have less data, more data or many different formats of data.

Figure 4:
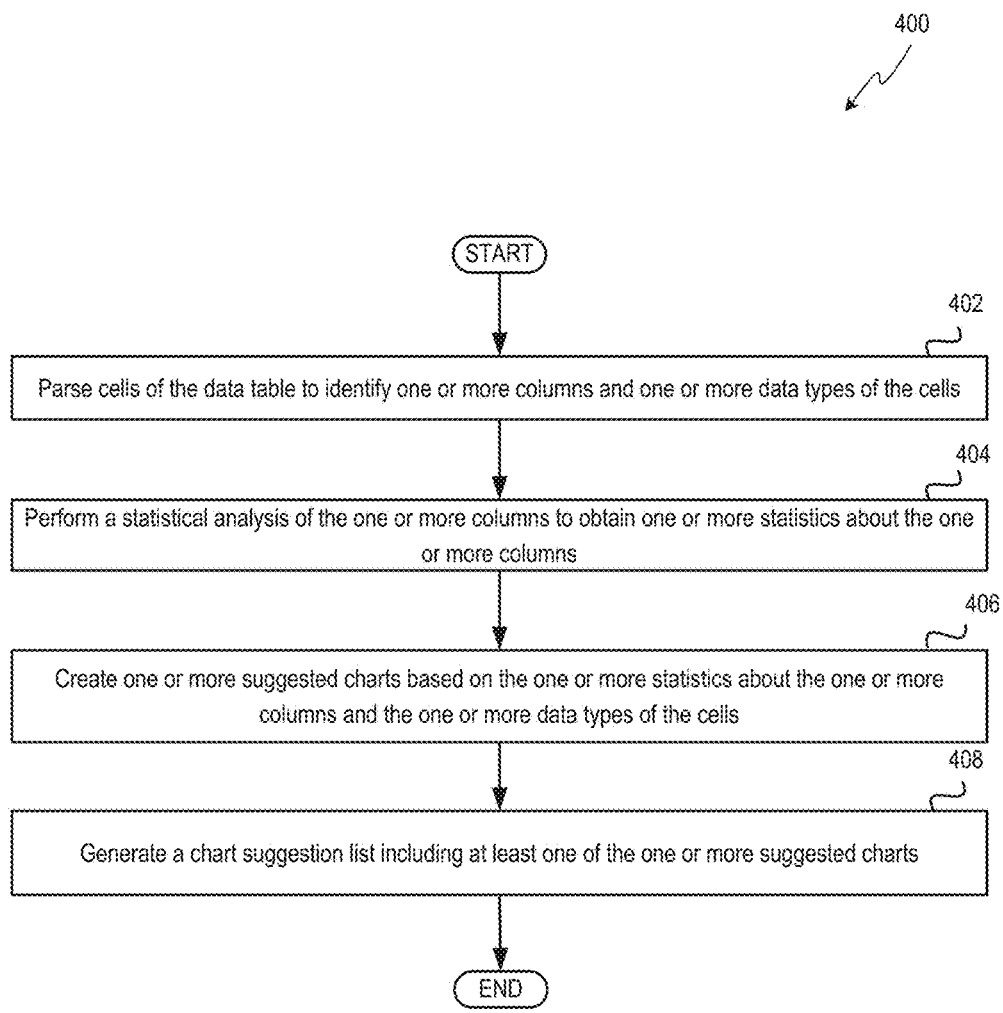
FIG. 4 depicts a flow diagram of aspects of a method for generating a chart suggestion list from data in a data table, in accordance with one implementation of the disclosure.

FIG. 4 depicts a flow diagram of aspects of a method 400 for generating a chart suggestion list 200 from data in a data table 120, in accordance with one implementation of the disclosure. Method 400 and each of its individual functions, routines, subroutines, or operations may be performed by one or more processing devices of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by one or more chart generation modules 124A-124Z executed by one or more processing devices of the servers 112A-112Z and/or the statistical engine 114 in the cloud-based environment 110. In some implementations, the method 400 may be performed by one or more processing devices of the user devices 140A-140Z executing the chart generation modules 124A-124Z and/or the statistical engine 114.

Method 400 may begin at block 402. At block 402, the processing device may parse cells of the data table 120 to identify one or more columns and one or more data types of the cells. The data table 120 may be located in a data store 118 or included in any suitable electronic document (e.g., spreadsheet document, word processing document, slideshow document, etc.). The electronic document may be shared with collaborators or may not be shared. The processing device may also identify column headers of each of the columns. The data types of the columns may include strings, numbers, dates, currency, floating point numbers, or any suitable data type.

At block 404, the processing device may perform a statistical analysis of the one or more columns to obtain one or more statistics 121 about the one or more columns. The statistics may include an aggregation of the number of unique values in each of the columns, a range of values in each of the columns, a distribution of data in each of the columns, a number of rows in the columns, an average of data in each of the columns, and so forth. Further, statistics 121 may also include a size of the data table 120.

At block 406, the processing device may create one or more suggested charts based on the one or more statistics 121 about the one or more columns and the one or more data types of the cells. In some implementations, creating the one or more suggested charts may include applying one or more rules 125A to the data table 120. The one or more rules may be used to identify a relationship between at least two columns of the one or more columns. As discussed above, the identified relationship may be a relationship between column headers of the at least two columns that is defined as being suitable/designated for visualization, or a relationship defined by a correlation between values of the at least two columns. For example, the rule may specify a relationship for sales information between a column header related to a region where a product is sold and column headers related to actual sales data of the product. Another relationship may specify a correlation when it is determined that values in two different columns trend together (e.g., both increase, both decrease, or one increases while the other decreases). The one or more rules may also define how to score suggested chart types. Based on these scores, one or more suggested chart types that score above a minimum threshold can be identified. The processing device may create the suggested charts based on the identified chart types for at least a subset of data in the data table 120. In some implementations, the one or more rules may define how to score the suggested charts as discussed further with reference to FIG. 5.

In some implementations, creating the one or more suggested charts may include applying the one or more statistics 121 about the one or more columns and the one or more data types of the cells as inputs to a machine learning model 123 that is trained to output one or more chart types. The machine learning model 123 may be trained using the annotated charts 122 that may provide annotations for various training data tables input and the corresponding charts that are output based on the input data tables. For example, the annotations may specify statistics in the training data tables, relationships between groups of data in the training data tables, data types in the training data tables, prerequisite criteria of chart types that are suitable for the training data table, or the like. The processing device may create the one or more suggested charts based on the output chart types.

At block 408, the processing device may generate a chart suggestion list 200 including at least one of the one or more suggested charts. The user interface 144A may be provided for display on the user device 144A and the user interface 144A may include a first portion to present the chart suggestion list 200 and a second portion to concurrently present the data table 120. The chart suggestion list 200 may be displayed in the insights table 204. A user may select to add any of the suggested charts displayed in the chart suggestion list 200 to the electronic document including the data table 120 and the selected suggested chart may be inserted into the electronic document proximate to the data table 120.

In some implementations, the processing device may order the suggested charts in the chart suggestion list 200 based on the score, with the highest scoring suggested charts being displayed more preferentially (e.g., higher up) in the chart suggestion list 200. In some implementations, the processing device may also use a diversity criterion to determine the order of the suggested charts in the chart suggestion list 200. For example, if the top two charts with the highest scores are of a similar chart type and represent data in a similar fashion, a third chart having a different chart type may be rearranged to be displayed more prominently than the second highest ranking chart if the third chart is of a different type and represents the data in a different fashion. Thus, even though the third chart has a lower score than the second chart with the second highest score, the third chart may be displayed above the second chart.

In some implementations, the processing device may receive a selection of a suggested chart from the chart suggestion list 200. For example, the user may have selected the suggested chart (e.g., by single clicking an input apparatus on the suggested chart or hovering a cursor over the suggested chart) in the suggested chart list 200 without inserting the suggested chart into the electronic document.

The processing device may cause a visual indicator (e.g., highlighting) to be displayed for the cells in the data table 120 that are involved in the creation of the selected suggested chart. In some implementations, when the user selects to insert the suggested chart in the electronic document, the visual indicator may also be displayed for the cells in the data table 120 that are involved in the creation of the selected suggested chart.

In some implementations, the processing device may receive a selection of a subset of data in the data table 120. The user may highlight the subset of data in the data table 120 in the electronic document by dragging a box around the desired cells. The processing device may prioritize the selected subset of data to be used for chart creation. For example, the processing device may create one or more revised suggested charts to represent the selected subset of data. For example, new statistics may be obtained for the selected subset of data, new relationships may be identified for the selected subset of data, new data types may be determined for the selected subset of data, new prerequisite criteria for charts may be determined for the selected subset of data, etc. and the processing device may create the revised suggested charts accordingly. The processing device may also create suggested charts for the entire data table 120. The processing device may generate an updated chart suggestion list that includes at least one of the one or more revised suggested charts. The chart suggestion list may also include at least one of the suggested charts based on the entire data table 120. The processing device may preferentially rank and display the revised suggested charts that are based on the selected subset of data above the suggested charts based on the entire data table 120.

Figure 5:
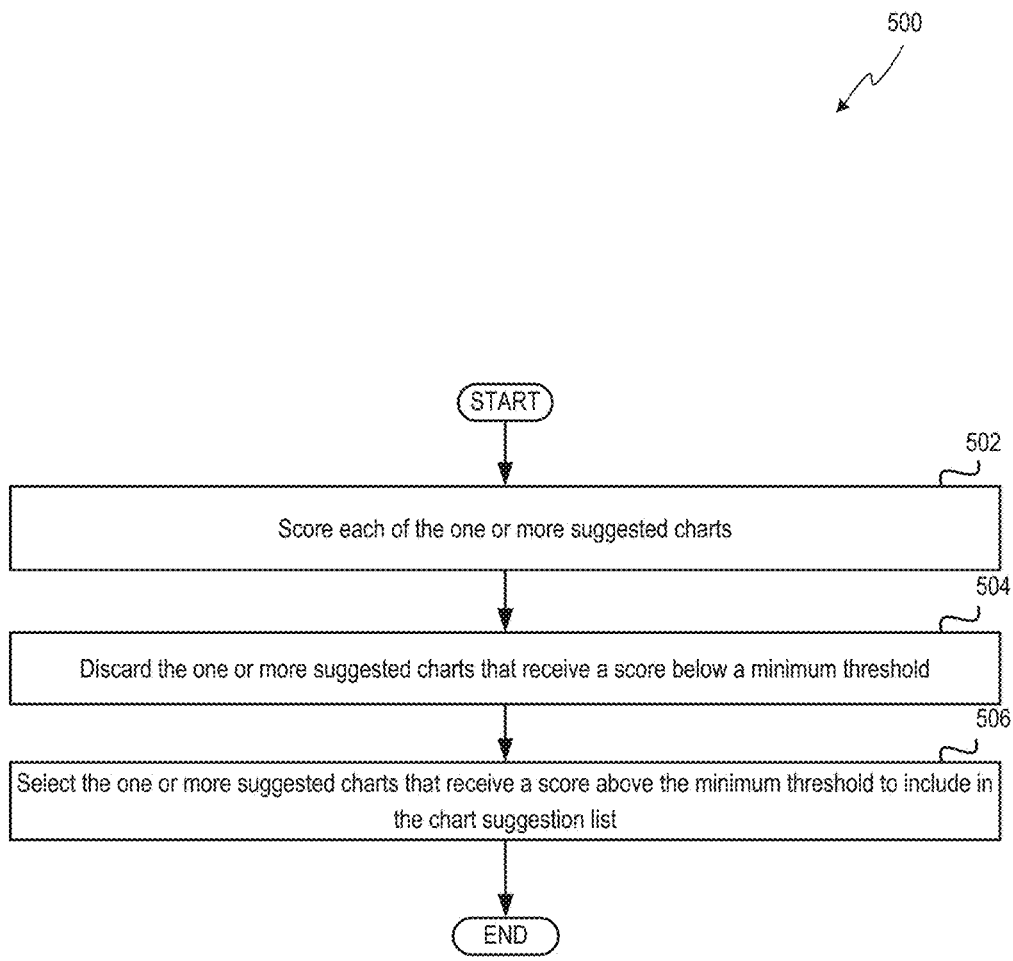
FIG. 5 depicts a flow diagram of aspects of a method for scoring generated charts using one or more rules to generate the chart suggestion list, in accordance with one implementation of the disclosure.

FIG. 5 depicts a flow diagram of aspects of a method 500 for scoring generated charts using one or more rules to generate the chart suggestion list 200, in accordance with one implementation of the disclosure. Method 500 may be performed in the same or a similar manner as described above in regards to method 400. In one implementation, method 500 may be performed by one or more chart generation modules 124A-118Z executed by one or more processing devices of the servers 112A-112Z and/or the statistical engine 114 in the cloud-based environment 110. In some implementations, the method 500 may be performed by one or more processing devices of the user devices 140A-140Z executing the chart generation modules 124A-118Z and/or the statistical engine 114.

Method 500 may begin at block 502. At block 502, the processing device may score each of the one or more suggested charts created as described above. The scoring may be performed by the processing device by applying the rules 125A-125Z or the machine learning model 123. The scoring may be based at least on one of the one or more data types of the cells, the one or more statistics 121 (e.g., aggregation of unique values in the columns, data value range, distribution of data, size of data table), one or more criteria (e.g., a number of columns that may be depicted in a certain chart type, whether the chart type can handle negative values, whether the chart reveals information that an original chart did not, etc.), and/or a relationship (e.g., a correlation between values of the columns, a relationship defined as designated for visualization, etc.) identified between at least two columns of the data table 120. In some implementations, the scoring may also be performed for suggested chart types using the rules 125A-125Z or the machine learning model 123.

At block 504, the processing device may discard the one or more suggested charts that receive a score below a minimum threshold. Discarding the suggested charts that receive a score below the minimum threshold may enable reducing the number of suggested charts displayed in the chart suggestion list 200, which may enhance processing speed of generating the chart suggestion list 200.

At block 506, the processing device may select the one or more suggested charts that receive a score above the minimum threshold to include in the chart suggestion list 200. The processing device may display the chart suggestion list 200 in the insights table 204 in a portion of the user interface 144A that also concurrently displays the data table 120 in another portion of the user interface 144A.

FIG. 6 illustrates an example of aggregate tables created from data present in a data table 120, according to an illustrative implementation. The data table 120 may be stored in a data store 118 or included in an electronic document (e.g., spreadsheet document, word processing document, slideshow document, etc.) that is either shared or not shared with collaborators. The data table 120 may be referred to as an initial data table and the aggregate tables may be referred to as additional tables herein.

Initial data table 120 contains four different columns Name 600, Answer 602, Value A 604 and Value B 606. Statistical analysis conducted on the initial data table 120 obtains statistics 121 indicating the number of unique values in each of the columns 600, 602, 604, and 606. An aggregate table 608 may be generated based on the statistics (e.g., unique values in each column of the table 120). In some implementations, the determination to select a column to generate an aggregate table may be made based on the number of unique values in the column. For example, if a column has relatively fewer unique values, the unique values might be more significant than the unique values from a column containing a relatively large number of unique values. As depicted, the Answer column 602 has only two unique values Yes and No, compared to the other columns in the table (e.g., Name column 600 has five unique values). Application of one or more of the rules 125A-125Z or the machine learning model 123 may result in scoring the aggregate table 608 generated based on Answer 602 higher than any other aggregate table generated from table 402 because of the limited number of unique values. Further, upon determining that the Value A column 604 and the Value B column 606 have a numbers data type, the rule 125-125Z or the machine learning model 123 may be applied to generate the aggregate table 608 by adding the numbers of Value A column 604 and Value B column 410 for each unique response in Answer column 602.

The aggregate table 608 includes three columns, Answer 610, Sum of Value A 612, and Sum of Value B 614. The Answer column 610 includes Yes and No row entries and the respective sums are depicted in the Sum of Value A column 612 and the Sum of Value B column 614. Accordingly, the aggregate table 608 represents transformed data from the initial data table 120. The transformation applied to the data in the initial data table 120 includes summing the values associated with Yes in Value and Value B and summing the values associated with No in Value A and Value B. It should be understood that other transformations, such as averaging, may be applied. The resulting aggregate table 608 may include a subset of data (e.g., Yes and No) from the initial data table 120, as well as the newly transformed data that is not directly represented in the initial data table 120.

Another aggregate table 616 may be generated based on the Answer 602 column in the initial data table 120 having the fewest unique values. In particular, aggregate table 616 includes columns for Answer 618 and Count 620. The aggregate table 616 shows the entries (Yes and No) of the Answer column 618 and the count (2 and 3) for how many times they appear in the initial data table 120. As such, the aggregate data table 616 includes a subset of data from the initial data table 120 and transformed data (e.g., the count).

The aggregate tables 608 and 616 may be represented in the form of charts and graphs as shown in FIGS. 2 and 3. Generating charts using the reduced subset of data in the aggregate tables 608 and 616 may enhance processing speed and/or reduce network traffic by sending a chart created using reduced datasets to various user devices 140A-140Z. The charts related to the aggregate tables 608 and 610 may be created and then scored based on a multitude of factors, as described above. Some of these factors may include the number of unique values in the column and/or the number of columns that may be depicted in a certain chart. In some implementations, while determining the chart type to represent the information in the aggregate tables 608 and 616, the rule 125A or the machine learning model 123 determines whether the charts meet certain prerequisite criteria for depicting the information in the aggregate table 608 and/or 616. For example, a pie chart may not be used to represent an aggregate table with negative values.

Figure 7:
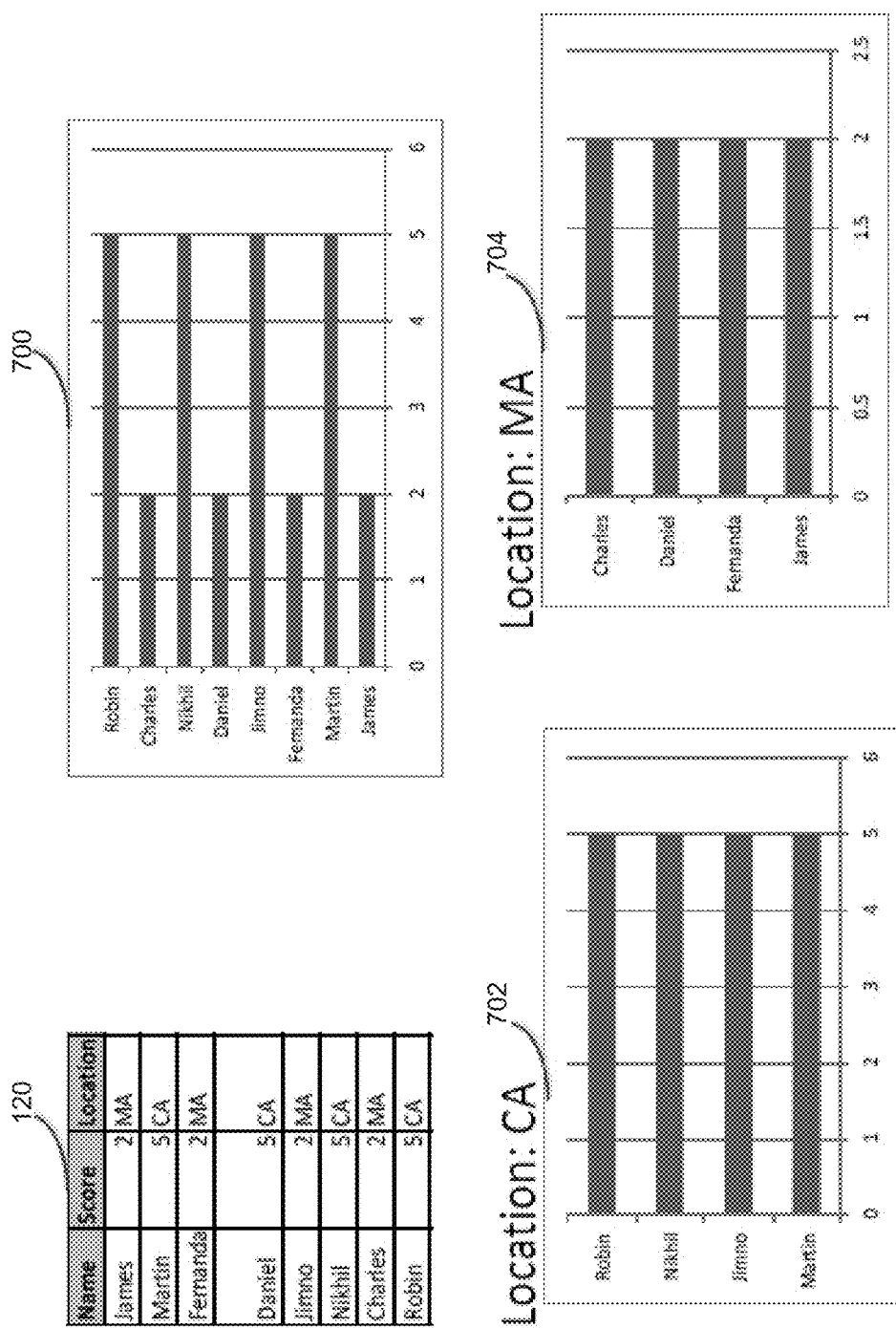
FIG. 7 illustrates an example of a faceted chart set generated from data present in a data table, according to an illustrative implementation.

FIG. 7 illustrates an example of a faceted chart set generated from data present in a data table 120, according to an illustrative implementation. Faceted versions of charts and tables are of the same type over the same data. The selection of whether to facet a chart or not may depend on certain factors, such as whether the faceted charts contain information not contained in the first chart from which the faceted charts are generated. In some implementations, the rule 125A or the machine learning model 123 may be used to determine whether the chart is facetable or not. For example, data tables containing few repetitions of unique values in columns may not be facetable. In some implementations, the statistical analysis can be performed to also determine which column or columns may be faceted based on the unique values of each of the columns. The column determined to be faceted may be referred to as a categorical column.

In particular, the data table 120 in FIG. 7 includes a Location column that includes two unique values (MA and CA). Accordingly, the Location column may be selected as the categorical column because it has the fewest number of unique values as compared to the other columns in the data table 120. For every categorical column in a data table 120, a facet chart may be generated and each of the faceted charts may be scored based on the concept of normalized mutual information. The more the information represented in a faceted chart is, the higher the score of the faceted chart may be. The faceted charts are scored high, if the faceted charts reveal information that the original chart did not.

For example, an initial chart 704 is generated for table 120 based on the statistics of the data table 120, an identified relationship of at least two columns in the data table 120, data types of the cells, etc. The rule 125A or the machine learning model 123 may be applied to the chart 504, which may result in determining that the chart may be facetable based on the categorical column of Location. For example, the rule 125A or the machine learning model may determine that faceting by the Location column contains high mutual information with the Score column. As depicted, each entry of CA for the Location column is associated with a value of 5 for the Score column, and each entry of MA for Location is associated with a value of 2 for the Score column. As such, additional versions of the chart 700 faceted by location may be scored high. The scoring of the faceted charts may be conducted on an arbitrary scale predetermined by the user. Based on the analysis, the chart generation module 124A may generate faceted charts 702 and 704 that are generated using a subset of data from the chart 700 but are divided up by Location. For example, the faceted chart 702 is divided up from the chart 700 by CA for Location and the faceted chart 704 is divided up from the chart 700 by MA for Location. Generating the faceted charts 702 and 704 may increase processing speed by using just a subset of data from the initial data table 120, while also presenting interesting information to the user.

Figure 8:
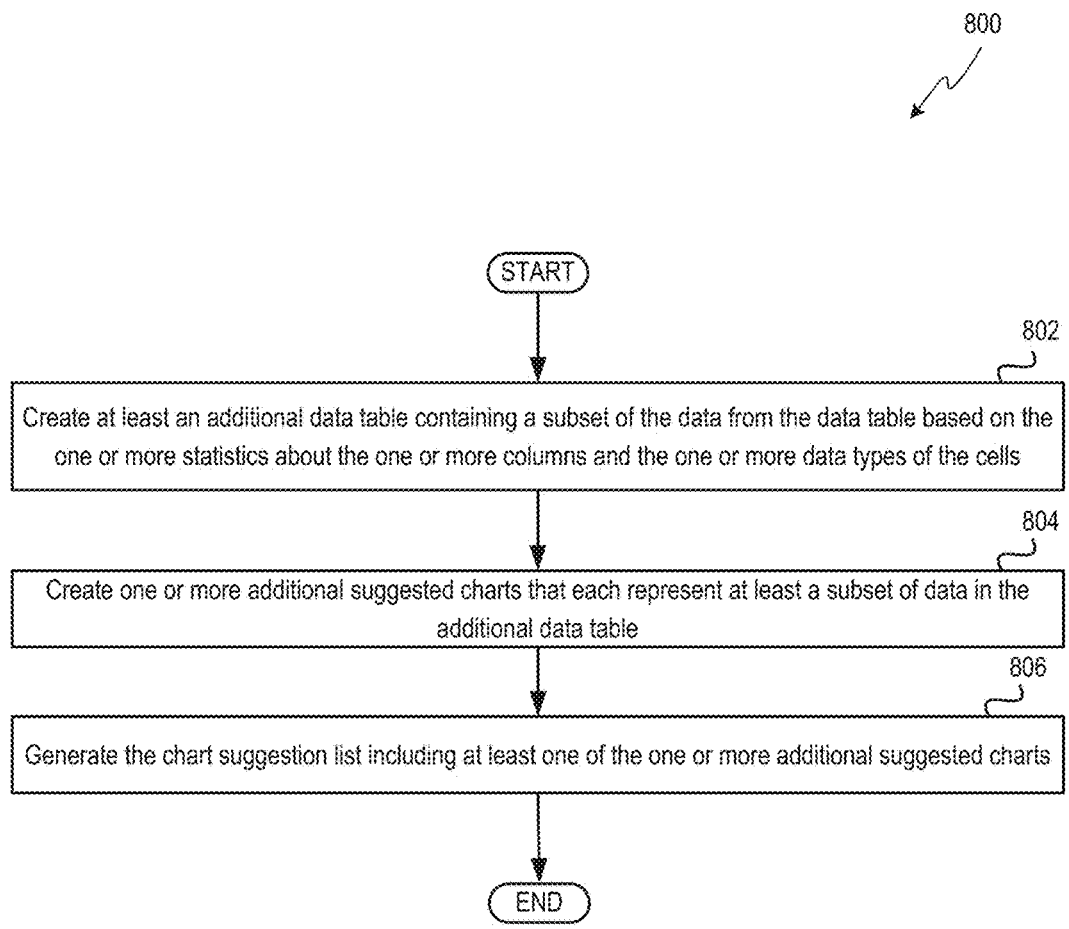
FIG. 8 depicts a flow diagram of aspects of a method for generating a chart suggestion list from data in an additional data table that is generated from an initial data table, in accordance with one implementation of the disclosure.

FIG. 8 depicts a flow diagram of aspects of a method 800 for generating a chart suggestion list 200 from data in an additional data table that is generated from an initial data table, in accordance with one implementation of the disclosure. Method 800 may be performed in the same or a similar manner as described above in regards to method 400. In one implementation, method 800 may be performed by one or more chart generation modules 124A-118Z executed by one or more processing devices of the servers 112A-112Z and/or the statistical engine 114 in the cloud-based environment 110. In some implementations, the method 800 may be performed by one or more processing devices of the user devices 140A-140Z executing the chart generation modules 124A-118Z and/or the statistical engine 114.

Method 800 may begin at block 802. At block 802, the processing device may create at least one additional table containing a subset of the data from an initial data table based on the statistics 121 about the columns of the initial data table and the one or more data types of the cells. The additional table may be an aggregate table as described above with reference to FIG. 6. In some implementations, the additional data table may be displayed proximate to the initial data table in the user interface 144A of the electronic document.

At block 804, the processing device may create one or more additional suggested charts that each represent at least a subset of data in the additional data table. The additional suggested charts may be created by applying the rules 125A-125Z or the machine learning model 123 to the additional data table based on the statistics 121 of the additional data table, a relationship identified between columns of the additional data table, data types of cells in the additional data table, prerequisite criteria for charts to represent the additional data table, etc. In some implementations, the charts may be bar charts that represent aggregate tables, for example. In some implementations, the additional suggested charts may be the faceted charts described with reference to FIG. 7. At least one of the one or more additional suggested charts in the first chart suggestion list may represent transformed data. The transformed data may result from a transformation applied to the data in the initial data table. The transformed data may not be depicted in the initial data table, and the transformation may include at least one of aggregating, summing, or averaging.

At block 806, the processing device may generate the chart suggestion list 200 including at least one of the one or more additional suggested charts. The rule 125A-125Z or the machine learning model 123 may score the additional suggested charts, which may be arranged in the chart suggestion list 200 based on the score and/or a diversity criterion. The chart suggestion list 200 may be displayed in the insights table 204 of the user interface 144A concurrently with the initial data table and/or the additional data table that was created.

Figure 9:
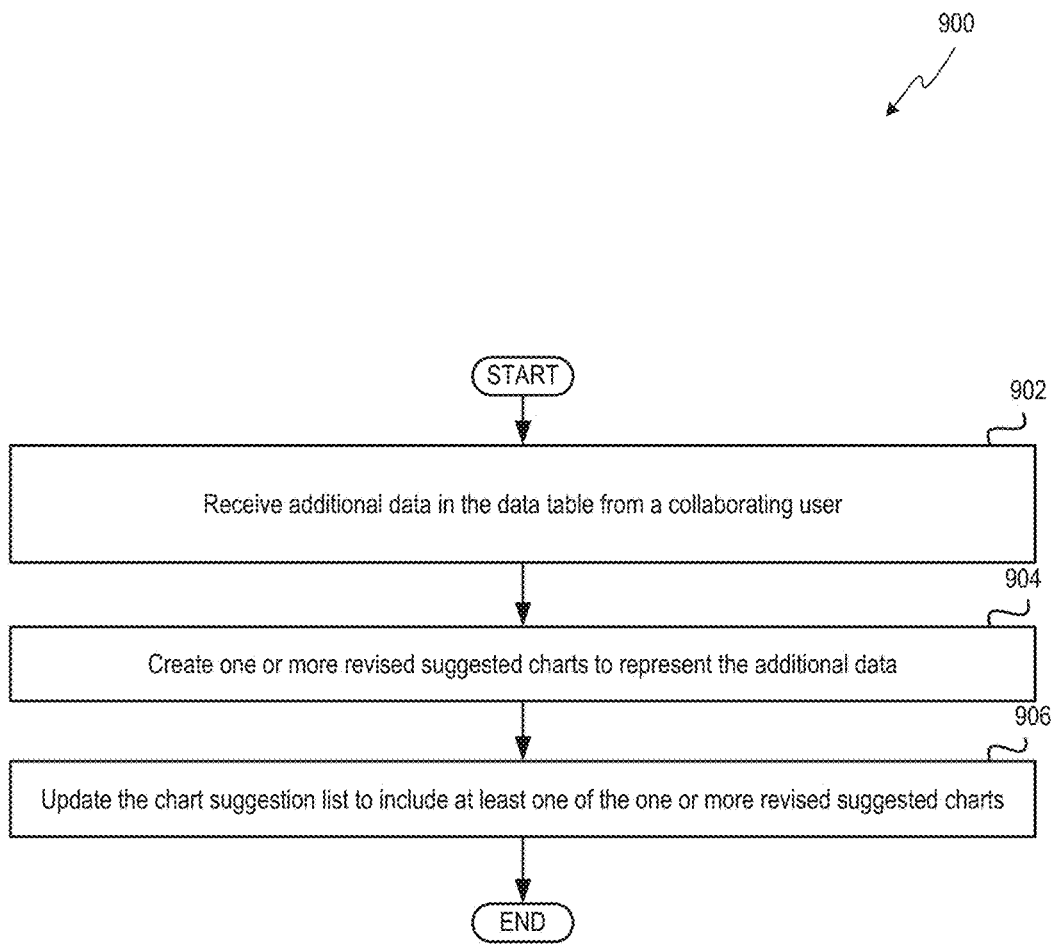
FIG. 9 depicts a flow diagram of a method for receiving additional data from a collaborating user and generating a second chart suggestion list including a chart based on the additional data, according to an illustrative implementation.

FIG. 9 depicts a flow diagram of a method 900 for receiving additional data from a collaborating user and generating a second chart suggestion list including a chart based on the additional data, according to an illustrative implementation. Method 900 may be performed in the same or a similar manner as described above in regards to method 400. In one implementation, method 900 may be performed by one or more chart generation modules 124A-118Z executed by one or more processing devices of the servers 112A-112Z and/or the statistical engine 114 in the cloud-based environment 110. In some implementations, the method 900 may be performed by one or more processing devices of the user devices 140A-140Z executing the chart generation modules 124A-118Z and/or the statistical engine 114.

Method 900 may begin at block 902. At block 902, the processing device may receive additional data in the data table 120 from a collaborating user. For example, in instances when the data table 120 is included in a shared electronic document, the shared electronic document may be open in a user interface 144A on a first user device 140A and the shared electronic document may be concurrently open in another user interface 144B on a second user device 140B. The second user may add data to the data table 120.

The processing device may receive the additional data for the data table 120 and create (block 904) one or more revised suggested charts to represent the additional data. For example, new statistics may be obtained for the data table 120 including the additional data, new relationships may be identified, new data types may be determined, new prerequisite criteria for charts may be determined, etc. and the processing device may create the revised suggested charts accordingly.

At block 904, the processing device may update the chart suggestion list 200 to include at least one of the one or more revised suggested charts. The updated chart suggested list may be dynamically updated and displayed in the insights table 204 in the user interface 144A that is also displayed the data table 120 including the data added by a collaborating user.

Figure 10:
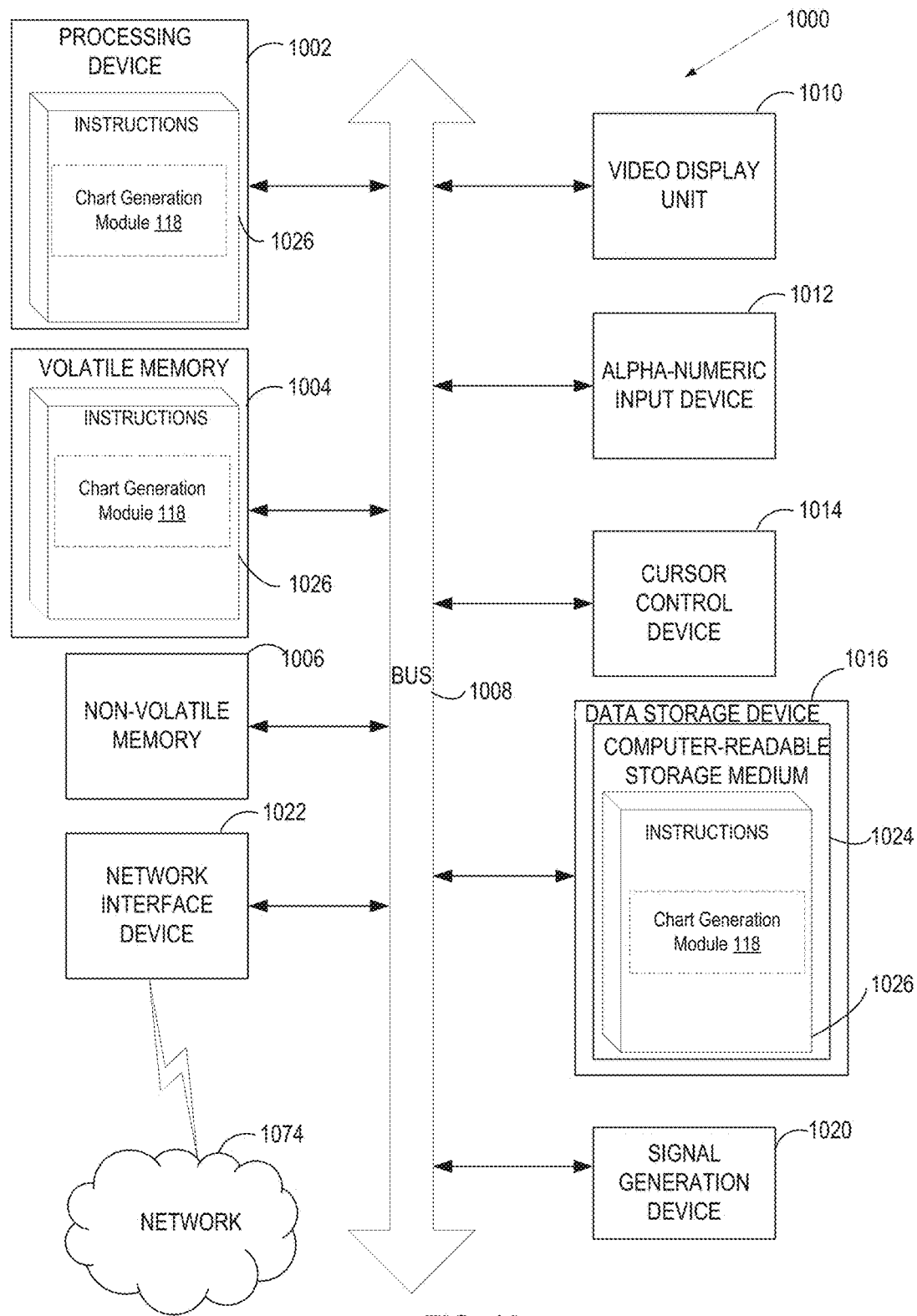
FIG. 10 depicts a block diagram of an example computing system operating in accordance with one or more aspects of the present disclosure.

FIG. 10 depicts a block diagram of an example computing system operating in accordance with one or more aspects of the present disclosure. In various illustrative examples, computer system 1000 may correspond to any of the computing devices within system architecture 100 of FIG. 1. In one implementation, the computer system 1000 may be each of the servers 112A-112Z, the statistical engine 114, or the training engine 116. In another implementation, the computer system 1000 may be each of the user devices 140A-140Z.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1006 (e.g., read-only memory (ROM) or electrically-erasable programmable ROM (EEPROM)), and a data storage device 2316, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions implementing the chart generation module 125 (125A-125Z), the statistical engine 114, and/or the training engine 116 of FIG. 1 for implementing any of the methods described herein.

Instructions 1026 may also reside, completely or partially, within volatile memory 1004 and/or within processing device 1002 during execution thereof by computer system 1000, hence, volatile memory 1004 and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method for generating a chart suggestion list using data present in a data table of a collaborative spreadsheet stored in a cloud-based environment, the method comprising:
   providing the collaborative spreadsheet to be displayed on a first device of a first user, wherein the collaborative spreadsheet is shared with a second user by granting permissions to the second user that allows the second user to concurrently edit the collaborative spreadsheet on a second device while the first user edits the collaborative spreadsheet on the first device;
   parsing cells of the data table to identify one or more columns and one or more data types of the cells;
   performing a statistical analysis of the one or more columns to obtain one or more statistics about the one or more columns;
   creating one or more suggested charts based on the one or more statistics about the one or more columns and the one or more data types of the cells wherein each of the one or more suggested charts represents at least a subset of the data in the data table;
   generating a chart suggestion list including at least one of the one or more suggested charts;
   presenting the chart suggestion list on the first device of the first user;
   receiving additional data in the data table from the second device of the second user, the additional data added by the second user while editing the collaborative spreadsheet on the second device concurrently with the editing of the collaborative spreadsheet on the first device;
   while the chart suggestion list is presented on the first device of the first user, automatically revising at least one of the created one or more suggested charts to generate one or more revised suggested charts representing the additional data from the second device of the second user;
   updating the chart suggestion list presented on the first device of the first user to include at least one of the one or more revised suggested charts, wherein the updating is concurrent with viewing of the collaborative spreadsheet on the first device; and
   responsive to receiving, from the first device of the first user, a selection of a suggested chart of the chart suggestion list, inserting the suggested chart into the collaborative spreadsheet, the inserted suggested chart to be presented with the data table on the first device of the first user.

2. The method of claim 1, further comprising providing a user interface comprising a first portion to present the chart suggestion list and a second portion to concurrently present the data table.

3. The method of claim 1, wherein:
   creating the one or more suggested charts comprises applying one or more rules to the data table;
   the one or more rules define a relationship between at least two columns of the one or more columns, the defined relationship including at least one of a relationship between column headers of the at least two columns that is designated for visualization, or a correlation between values of the at least two columns; and
   the one or more rules define how to determine one or more chart types based on at least one of the one or more statistics about the one or more columns, the one or more data types of the cells, or the defined relationship.

4. The method of claim 1, wherein creating the one or more suggested charts comprises applying the one or more statistics about the one or more columns and the one or more data types of the cells as inputs to a machine learning model that is trained to produce one or more chart types as a target output, the one or more charts are created based on the produced chart types.

5. The method of claim 1, further comprising:
   creating at least a second data table containing a subset of the data from the data table based on the one or more statistics about the one or more columns and the one or more data types of the cells;
   creating one or more additional suggested charts that each represent at least a subset of data in the second data table; and
   generating the chart suggestion list including at least one of the one or more additional suggested charts.

6. The method of claim 1, further comprising:
   scoring each of the one or more suggested charts based at least on one of the one or more data types of the cells, the one or more statistics, one or more criteria related to the one or more suggested charts, or a relationship identified between at least two columns of the one or more columns;
   discarding the one or more suggested charts that receive a score below a minimum threshold; and
   selecting the one or more suggested charts that receive a score above the minimum threshold to include in the chart suggestion list.

7. The method of claim 1, further comprising:
   receiving a selection of a suggested chart from the chart suggestion list; and
   causing display of an indicator for a plurality of cells in the data table involved in creating the selected suggested chart.

8. The method of claim 1, further comprising:
   receiving a selection of a subset of data in the data table;
   creating one or more revised suggested charts to represent the selected subset of data; and
   generating a second chart suggestion list including at least one of the one or more revised suggested charts.

9. The method of claim 1, wherein at least one of the one or more charts in the chart suggestion list represents transformed data, the transformed data resulting from a transformation applied to the data in the data table, the transformed data not depicted in the data table, and the transformation comprising at least one of aggregating, summing, or averaging.

10. The method of claim 1, wherein the one or more statistics comprise at least one of a number of unique values in each of the one or more columns, a distribution of data in each of the one or more columns, a size of the data table, an average of data values in each of the one or more columns, or a range of data in each of the one more columns.

11. The method of claim 1, further comprising:
rearranging the one or more charts in the chart suggestion list by a processing device; and
selecting a first chart with a lower score to be displayed more prominently than a second chart with a higher score based at least on types of charts of the first chart and the second chart in relation to a type of chart of a third chart with a higher score than the second chart, wherein the types of charts of the third chart and the second chart are the same, and the type of chart of the first chart is different than the types of charts of the third chart and the second chart.

12. A system for generating a chart suggestion list using data present in a data table of a collaborative spreadsheet stored in a cloud-based environment, comprising:
a memory device storing instructions; and
a processing device coupled to the memory device, the processing device to execute the instructions to:
provide the collaborative spreadsheet to be displayed on a first device of a first user, wherein the collaborative spreadsheet is shared with a second user by granting permissions to the second user that allows the second user to concurrently edit the collaborative spreadsheet on a second device while the first user edits the collaborative spreadsheet on the first device;
parse cells of the data table to identify one or more columns and one or more data types of the cells;
perform a statistical analysis of the one or more columns to obtain one or more statistics about the one or more columns;
create one or more suggested charts based on the one or more statistics about the one or more columns and the one or more data types of the cells, wherein each of the one or more suggested charts represents at least a subset of the data in the data table;
generate a chart suggestion list including at least one of the one or more suggested charts;
present the chart suggestion list on the first device of the first user;
receive additional data in the data table from the second device of the second user, the additional data added by the second user while editing the collaborative spreadsheet on the second device concurrently with the editing of the collaborative spreadsheet on the first device;
while the chart suggestion list is presented on the first device of the first user, automatically revise at least one of the created one or more suggested charts to generate one or more revised suggested charts representing the additional data from the second device of the second user;
update the chart suggestion list presented on the first device of the first user to include at least one of the one or more revised suggested charts, wherein the updating is concurrent with viewing of the collaborative spreadsheet on the first device; and responsive to receiving, from the first device of the first user, a selection of a suggested chart of the chart suggestion list, insert the suggested chart into the collaborative spreadsheet, the inserted suggested chart to be presented with the data table on the first device of the first user.

13. The system of claim 12, wherein the processing device is further to provide a user interface comprising a first portion to present the chart suggestion list and a second portion to concurrently present the data table.

14. The system of claim 12, wherein the processing device is to create the one or more suggested charts by applying one or more rules to the data table, the one or more rules define a relationship between at least two columns of the one or more columns, the defined relationship including at least one of a relationship between column headers of the at least two columns that is designated for visualization or a correlation between values of the at least two columns, and the one or more rules define how to determine one or more chart types based on at least one of the one or more statistics about the one or more columns, the one or more data types of the cells, or the defined relationship.

15. The system of claim 12, wherein the processing device is to create the one or more suggested charts by applying the one or more statistics about the one or more columns and the one or more data types of the cells as inputs to a machine learning model that is trained to produce one or more chart types as a target output, the one or more charts are created based on the produced chart types.

16. The system of claim 12, wherein the processing device is further to:
create at least a second data table containing a subset of the data from the data table based on the one or more statistics about the one or more columns and the one or more data types of the cells;
create one or more additional suggested charts that each represent at least a subset of data in the second data table; and
generate the chart suggestion list including at least one of the one or more additional suggested charts.

17. One or more tangible, non-transitory computer-readable storage media storing instructions for generating a chart suggestion list using data present in a data table of a collaborative spreadsheet stored in a cloud-based environment, the instructions, when executed by one or more processing devices, cause the one or more processing devices to:
provide the collaborative spreadsheet to be displayed on a first device of a first user, wherein the collaborative spreadsheet is shared with a second user by granting permissions to the second user that allows the second user to concurrently edit the collaborative spreadsheet on a second device while the first user edits the collaborative spreadsheet on the first device;
parse cells of the data table to identify one or more columns and one or more data types of the cells;
perform a statistical analysis of the one or more columns to obtain one or more statistics about the one or more columns;
create one or more suggested charts based on the one or more statistics about the one or more columns and the one or more data types of the cells, wherein each of the one or more suggested charts represents at least a subset of the data in the data table; generate a chart suggestion list including at least one of the one or more suggested charts;

present the chart suggestion list on the first device of the first user;

receive additional data in the data table from the second device of the second user, the additional data added by the second user while editing the collaborative spreadsheet on the second device concurrently with the editing of the collaborative spreadsheet on the first device;

while the chart suggestion list is presented on the first device of the first user, automatically revise at least one of the created one or more suggested charts to generate one or more revised suggested charts representing the additional data from the second device of the second user;

update the chart suggestion list presented on the first device of the first user to include at least one of the one or more revised suggested charts, wherein the updating is concurrent with viewing of the collaborative spreadsheet on the first device; and responsive to receiving, from the first device of the first user, a selection of a suggested chart of the chart suggestion list, insert the suggested chart into the collaborative spreadsheet, the inserted suggested chart to be presented with the data table on the first device of the first user.

18. The computer-readable storage media of claim 17, wherein the one or more processing devices are to create the one or more suggested charts by applying one or more rules to the data table, the one or more rules define a relationship between at least two columns of the one or more columns, the defined relationship including at least one of a relationship between column headers of the at least two columns that is designated for visualization or a correlation between values of the at least two columns, and the one or more rules define how to determine one or more chart types based on at least one of the one or more statistics about the one or more columns, the one or more data types of the cells, or the defined relationship.

19. The computer-readable storage media of claim 17, wherein the one or more processing devices are to create the one or more suggested charts by applying the one or more statistics about the one or more columns and the one or more data types of the cells as inputs to a machine learning model that is trained to produce one or more chart types as a target output, the one or more charts are created based on the produced chart types.

* * * * *